(12) United States Patent
Wilson (10) Patent No.: US 6,207,953 B1
(45) Date of Patent: Mar. 27, 2001

(54) APPARATUS AND METHODS FOR DETERMINING GAS SATURATION AND POROSITY OF A FORMATION PENETRATED BY A GAS FILLED OR LIQUID FILLED BOREHOLE

(76) Inventor: Robert D. Wilson, 477 W. Scenic Dr., Grand Junction, CO (US) 81503

( * ) Notice: Subject to any disclaimer, the term of this patent is extended or adjusted under 35 U.S.C. 154(b) by 0 days.

(21) Appl. No.: 09/066,729

(22) Filed: Apr. 24, 1998

(51) Int. Cl.[7] .................................................. G01V 5/10
(52) U.S. Cl. .................... 250/269.4; 250/269.6; 250/269.8
(58) Field of Search .................... 250/269.6, 269.2, 250/269.4, 265, 266

(56) References Cited

U.S. PATENT DOCUMENTS

| | | | |
|---|---|---|---|
| 4,122,339 | * 10/1978 | Smith et al. | 250/269.6 |
| 4,454,420 | * 6/1984 | Smith | 250/269.6 |
| 5,068,532 | * 11/1991 | Wormald et al. | 250/269.2 |
| 5,804,820 | * 9/1998 | Evans et al. | 250/269.6 |

OTHER PUBLICATIONS

Wilson, "Bulk density Logging With High–Energy Gammas Produced by Fast Neutron Reactions With Formation Oxygen Atoms", 1995 IEEE Nuclear Sicience Sym. 1995.

* cited by examiner

Primary Examiner—Seungsook Ham
Assistant Examiner—Richard Hanig
(74) Attorney, Agent, or Firm—Felsman, Bradley, Vaden, Gunter & Dillon, LLP (57) ABSTRACT

Methods and apparatus are disclosed for determining gas saturation, liquid saturation, porosity and density of earth formations penetrated by a well borehole. Determinations are made from measures of fast neutron and inelastic scatter gamma radiation induced by a pulsed, fast neutron source. The system preferably uses two detectors axially spaced from the neutron source. One detector is preferably a scintillation detector responsive to gamma radiation, and a second detector is preferably an organic scintillator responsive to both neutron and gamma radiation. The system can be operated in cased boreholes which are filled with either gas or liquid. Techniques for correcting all measurements for borehole conditions are disclosed.

24 Claims, 4 Drawing Sheets

APPARATUS AND METHODS FOR DETERMINING GAS SATURATION AND POROSITY OF A FORMATION PENETRATED BY A GAS FILLED OR LIQUID FILLED BOREHOLE

This invention was made with Government support under Contract No. DE-AC04-94AL96907 awarded by the Department of Energy. The Government has certain rights in this invention.

BACKGROUND OF THE INVENTION

This invention is directed toward logging of earth formations penetrated by a borehole, and more particularly directed toward the determination of formation gas saturation and other formation parameters from measures of fast neutron and inelastic scatter gamma radiation induced by a pulsed, fast neutron source.

In the context of this disclosure, "logging" is defined as the measure of a parameter of material penetrated by a borehole, as a function of depth within the borehole. Parameters of interest include density, porosity, and the liquid and gas saturation of the formation.

Density logging systems, which are compensated somewhat for the effects of the borehole, were introduced in the mid 1960s in the paper "The Physical Foundation of Formation Density Logging (Gamma-Gamma)", J. Tittman and J. S. Wahl, Geophysics, Vol. 30, p. 284, 1965. The system introduced by Tittman et al, commonly referred to as a compensated gamma-gamma density logging system, was designed to operate in boreholes which are "open" and contain no steel casing. An instrument or "tool" is lowered into the well borehole on a cable, and the depth of the tool is determined by the amount of cable deployed at the surface of the earth. This type of tool contains an intense gamma-ray source and preferably two gamma-ray detectors at differing distances from the source. The gamma ray detectors measure gamma rays which are scattered from electrons in the formation, and back into the borehole. Since for most earth formations, the electron density is in constant proportion to mass bulk density, the "backscatter" gamma ray intensity at the detectors provides a measure of formation bulk density. Two detectors are preferably employed to allow the measurement to be compensated for the effect of mudcake that tends to accumulate on the borehole wall from drilling fluid used in the drilling process.

The gamma-gamma density tool has a characteristic shallow depth of investigation into the formation of about 4 inches ("Depth of Investigation of neutrons and Density Sondes for 35% Porosity Sand", H. Sherman and S. Locke, Proc. 16th Annual SPWLA Symp., Paper T, 1975) and therefore is heavily influenced by the near borehole environment. This tool cannot make quantitative density logs in boreholes which have been cased, where the casing is typically steel and is surrounded by a cement sheath.

One technique for measuring formation porosity utilizes a porosity sensitive tool known in the industry as a "neutron-neutron" porosity system (Dual-Spaced Neutron Logging for Porosity", L. Allen, C. Tittle, W. Mills and R. Caldwell, Geophysics Vol. 32, pp. 60–68, 1967). The downhole tool portion of the system contains a source of fast neutrons which is typically an isotopic source such as Americium-Beryllium (AmBe). Preferably two detectors sensitive to thermal or epithermal neutrons are axially spaced from the source at different distances. The detectors respond primarily to thermal or epithermal neutrons back-scattered into the borehole by the formation. The measured back-scatter flux is, in turn, primarily a function of the hydrogen content of the formation. If it is assumed that most hydrogen within the formation is contained in water or hydrocarbon in the pore space, the detectors respond to the porosity of the formation. As with the compensated density tool, the two neutron detectors respond to events at differing radial depths in the formation. The ratio of the detector response is formed to minimize the effects of reactions within the borehole, and porosity is determined from this ratio. The radial depth of investigation is about 9 or 10 inches, and the system can be calibrated to operate in both open and cased boreholes.

Cased and/or cemented borehole density logging can presently be done only with the borehole gravity technique. Logging with a gravimetry tool is time consuming and since it responds to a very large spatial volume of formation material, it has very poor depth resolution ("Well Logging for Physical Properties", J. R. Hearst and P. Nelson, Chapters 6 and 8, McGraw Hill, New York, 1985).

The pore space in formations is fully water saturated in formations below the water table, except when natural gas reservoirs are encountered. In natural gas bearing formations, a fraction of the pore space is partially liquid-saturated with some fraction containing water or possibly oil, and the remainder of the pore space is saturated with natural gas. Sometimes, the pressure of contained natural gas can be quite high. Above the water table, in the so called "vadose" zone, the pore space is also partially liquid saturated typically with water, with the remaining pore space containing air at near atmospheric pressure.

Prior art techniques for determining gas saturation of formations penetrated by an open borehole involve the combination of the responses of the conventional gamma-gamma type density tool and porosity sensitive neutron-neutron tool. When the density and porosity tools are calibrated for the water-saturated pore space condition, and when they log formations that are water-saturated, they will produce values for formation bulk density and formation porosity that are consistent with each other, assuming the tools are logging in a rock matrix that is the same as that used for calibration. However, when a formation zone is encountered where the pore water is replaced by gas, the porosity tool gives an erroneously low porosity indication, while the density tool correctly indicates a decrease in bulk density with corresponding apparent increase in porosity. This results in a "cross-over" of the log response curves from the two tools thereby indicating the presence of gas within the logged formation. This method is problematic in cased boreholes because of the more shallow investigation depth of the density log and its resulting greater sensitivity to variations in borehole conditions, such as variations in the thickness of the cement sheath, immediately behind the casing.

Gas has been detected in cased and cemented boreholes, with limited success, using a combination of a cased hole version of the compensated neutron-neutron logging tool and the gamma-gamma density tool. Cigni and Magrassi ("Gas Detection from Formation Density and Compensated Neutron Log in Cased Hole", M. Cigni and M. Magrassi, SPWLA 28th Annu. Logg. Symp., paper W, 1987) discuss the cased hole application of the neutron-neutron and gamma-gamma density logging tool combination. This method has been applied to the detection of gas migration in production and monitoring wells at the Prudhoe Bay fields of Alaska. Depth of investigation of the gamma-gamma measurement presents a problem as previously discussed. The neutron log also introduces a problem. Because the present day, commercial neutron-neutron porosity tool responds to changes in the thermal neutron distribution in the formation, which in turn is a function of hydrogen density within the formation, it is not able to distinguish between low porosity water-saturated formations and higher porosity partially gas-saturated formations since the hydrogen density in both formations can be the same. This is a serious disadvantage for the problem of formation gas detection, and is overcome by the density/gas saturation logging system set forth in this disclosure.

Logging for gas in cased, cemented boreholes is also performed using a logging tool containing a pulsed source of fast neutrons ("Examples of Dual Spacing Thermal Neutron Decay Time Logs in Texas Coast Oil and Gas Reservoirs", Trans. SPWLA 15th Annu. Logging Symp., 1979, and "The Use and Validation of Pulsed Neutron Surveys in Current Drilling Tests" Trans. SPWLA 19th Annu. Logg. Symp., 1978). This "pulsed-neutron decay time" or "pulsed neutron" tool, as it is known in the art, was designed to detect the presence of hydrocarbon liquids (oil) in formations where the water that otherwise fills the pore spaces is normally saline. This sensitivity to fluid type is achieved by measuring the formation thermal neutron cross section. However, the cross section is not very sensitive to the presence of gas, and therefore the logging tool is not very useful as a gas indicator. Another type of measurement can be performed with the pulsed-neutron decay time tool that is more sensitive to the presence of gas. This involves measuring a ratio of the tool's typically two axially spaced gamma detector responses. This ratio can, in turn, be interpreted in a manner that is sensitive to the presence of gas within the logged formation. Since the measured gamma radiation is produced by thermal neutron capture reactions, this response is similar to that of the neutron-neutron porosity log in that both are responding to changes in the spatial distribution of thermal neutrons which, in turn, is a function of hydrogen density. For this reason, the gamma ratio response, like the neutron-neutron porosity tool response, is not capable of distinguishing between low porosity formations and formations with higher porosity whose pore spaces are gas filled. The density/gas saturation logging system set forth in this disclosure, on the other hand, responds to the change in atom density and hence can distinguish between the gas saturated high porosity and liquid saturated low porosity formations.

The "carbon/oxygen" logging technique is well known in the art, and is used to delineate oil from fresh or saline water. Recently, the so called carbon/oxygen signal, which is "prompt" gamma radiation detected during the time of neutron production from the pulsed neutron type of logging tool, has been utilized to infer formation porosity ("Applications and Derivation of a New Cased Hole Density Porosity in Shaly Sand", R. C. Odum et al, Paper SPE 38699, annual Technical Conference and Exhibition, 1997). This tool has traditionally been used to detect the presence of oil in formations where the formation water has low salt content, and the pulsed neutron decay time log cannot distinguish oil from "fresh" water. More specifically, the system reported by Odum uses measures of inelastic scatter gamma radiation to determine water-saturated porosity of the logged formation. Porosity measurements using the carbon/oxygen logging equipment have been limited to the measurement of prompt gamma radiation, and do not involve the simultaneous measure of fast neutrons during the neutron burst.

U.S. Pat. No. 5,608,215 to Michael Evans discloses apparatus and methods for determining formation density by measuring and analyzing gamma radiation resulting from the irradiation of the formation with high energy neutrons. No method for simultaneously determining formation gas content is disclosed.

U.S. Pat. No. 5,539,225 to William A. Loomis et al discloses a measurement-while-drilling apparatus and method for determining formation density and gas. A high energy neutron source is used to irradiate the formation. Epithermal neutrons and gamma radiation are detected. The system is not suitable for use in cased boreholes.

U.S. Pat. No. 4,122,340 to Harry D. Smith, Jr. et al discloses a method for logging in which an earth formation penetrated by a borehole is irradiated with a pulsed source of fast neutrons, and the formation porosity is determined by making a dual spaced fast to epithermal neutron measurement. Prompt gamma radiation is not measured, and methods for distinguishing between high porosity gas filled zones and low porosity water filled zones are not disclosed.

U.S. Pat. No. 4,122,339 to Harry D. Smith, Jr. et al discloses a logging system which irradiates earth formations penetrated by a borehole with fast neutrons. Fast neutron population is inferred from inelastic scatter gamma radiation measured during bursts of fast neutrons from a pulsed neutron source using a gamma ray detector. An epithermal neutron detector is used to measure the epithermal neutron population following each neutron burst. Formation porosity is determined from the ratio of gamma ray detector to epithermal neutron detector responses. Two types of detectors (gamma ray and epithermal neutron) are used, and methods for distinguishing between high porosity gas filled zones and low porosity water filled zones are not disclosed.

U.S. Pat. No. 4,1134,011 to Harry D. Smith, Jr. et al discloses a method for logging in which earth formation penetrated by a borehole is irradiated with fast neutrons, and the formation porosity is determined by making a dual spaced fast to epithermal neutron measurement using a continuous source of fast neutrons. Prompt gamma radiation is not measured, and methods for distinguishing between high porosity gas filled zones and low porosity water filled zones are not disclosed.

U.S. Pat. No. 4,605,854 to Harry D. Smith, Jr. discloses a method for logging in which earth formation penetrated by a borehole is irradiated with fast neutrons, and the formation porosity is determined from a ratio of neutrons measured above 1 million electron volt (MeV) to the neutrons measured below 1 MeV. Gamma radiation is not measured, and methods for distinguishing between high porosity gas filled zones and low porosity water filled zones are not disclosed.

In view of the previously discussed prior art, an object of the present invention is to provide a logging system that measures the fractional gas saturation, fractional water saturation, and bulk density of earth material comprising the near-surface vadose zone surrounding boreholes that are open, that are cased, or that are cased and cemented.

Another object of the present invention is to provide a logging system that measures the bulk density and the presence of natural gas in earth material below the water table where the pore space is otherwise fully water saturated.

Yet another object of the present invention is to provide a logging system which measures water (or gas) saturation and formation bulk density in formations penetrated by cased and cemented boreholes in which conventional gamma-gamma and neutron-neutron log combinations yield erroneous results.

Still another object of the present invention is to provide a system which can delineate high porosity, gas saturated formations from low porosity, water saturated formations under all borehole conditions.

Another object of the present invention is to provide water (or gas) and bulk density measurements which "see" more deeply into the formation than conventional gamma-gamma and neutron-neutron logs.

Still another object of the present invention is to provide a single logging tool for performing all measurements required to obtain water (or gas) and formation bulk density measurements, thereby yielding better log interpretation and producing more accurate results than logs made with separate tools with differing investigation depths, as is the case with combining gamma-gamma and neutron-neutron logs.

Yet another object of the present invention is to provide a gas detection borehole log that has the potential for greater sensitivity to the presence of gas in the formation pore space than any prior art logging tools or combinations of responses of prior art logging tools.

Another object of the present invention is to provide a logging system which is safe to operate. The system uses a neutron generator source which can be turned off when not in use, as opposed to conventional gamma-gamma and neutron-neutron systems which use isotopic sources and therefore continuously emit gamma and neutron radiation, respectively. The present invention will be more easily licensed, and more acceptable to the user community for this reason.

A further object of the invention is to provide the porosity of earth material as computed from the measured bulk density and water saturation, given a knowledge of the material grain density.

Yet another object of the present invention is to provide a logging system which can simultaneously perform conventional logging measurements, such as thermal decay-time and neutron-neutron logs, for correlation with logs run previously in existing wells.

There are objects and applications of the present invention that will become apparent in the following disclosure.

SUMMARY OF THE INVENTION

The present invention is a logging system consisting of apparatus and methods for measuring the gas saturation, or equivalently water saturation, and the porosity, or equivalently the density, of earth formations penetrated by a well borehole. The apparatus consists of an elongated, pressure housed downhole instrument or "tool" containing an electronic source of high energy or "fast" neutrons, commonly referred to as a neutron generator. Fast neutrons are emitted in sequential bursts or "pulses". The tool also contains two or more axially spaced radiation detectors which measure the intensity and energy of radiations produced by various reactions of fast neutrons with formation nuclei.

Although the invention is directed toward measuring various properties of earth formations penetrated by a borehole, it should be understood that the disclosed apparatus and methods can be used to measure properties of other types of material such as construction materials and the like.

The methodology consists of acquiring count rates from the two or more detectors, individually and in combination, as the apparatus is raised or lowered inside a borehole. The apparatus is calibrated so that the measured count rates, and ratios of count rates, can be transformed into formation parameters of interest such as formation porosity and water or gas content. At least one of the measured count rates is proportional to fast neutron flux present during the sequential neutron bursts. Another measured count rate is proportional to prompt gamma radiation due to the inelastic scattering of fast neutrons off of formation and borehole nuclei during each neutron burst. By combining these two basic types of radiation measurement, earth formation bulk density (or porosity) and gas (or water) saturation of the formation pore space is determined. Both of these measurements derive from nuclear interaction processes of neutrons in the MeV range with the nuclei and electrons of atoms comprising the earth formation and surrounding borehole environs. One measurement is of the high energy (0.1 to 10 MeV) neutrons arriving at a fast neutron detector suitably axially spaced from the pulsed neutron source emitting typically 14 MeV neutrons, and a second measurement is of the high energy (0.1 to 10 MeV) inelastic scatter gamma radiation, which is produced promptly during the source neutron pulse, and subsequently arriving at one or more suitably axially spaced detectors.

The fast neutron measurement responds primarily to changes in water (or gas) saturation of the earth formation pore space, though it also responds to changes in bulk density of the formation. The prompt (inelastic) gamma measurement responds primarily to changes in formation bulk density, though it is also somewhat sensitive to the water content of the formation. By combining measured fast neutron and prompt gamma ray count rates, both gas (or water) saturation and porosity of the formation can be obtained if the lithology of the formation is known.

Turning again to the downhole logging tool, the pressure housing supports the internal components of the tool and protects them from a sometimes harsh external environment. For borehole logging, the tool is supported with a strong, flexible logging cable that also contains electronic conductors, providing connections and communication paths between the downhole tool and associated surface electronics of the system. The cable is connected to a hoist which provides for vertical movement of the tool within the borehole. The tool and hoist are controlled by surface electronics. A recorder displays and stores results of the logging measurements.

The pulsed neutron generator consists of a high energy neutron producing target with associated gas reservoir and accelerated ion beam, high voltage supplies and pulsing electronics, as is well known in the art. A monitor detector is preferably located close to the neutron target in order to monitor the somewhat variable neutron output. The neutron source is pulsed and is capable of variations in both the pulse repetition rate and the pulse width. In the preferred embodiment, a pulse repetition rate of 3,000 Hertz (Hz) with a width of about 30 microseconds (msec) is used.

Turning now to the tool detectors, a first or "near" detector, which is preferably a gamma ray detector, is axially spaced from the target of the neutron generator, and shielded from direct flux from the neutron generator with suitable shielding material. A second detector, or "far" detector, is axially spaced from the target of the neutron generator at a distance greater than the near detector. The far detector is preferably a liquid scintillator that responds to both fast neutrons and gamma rays by producing light flashes or scintillations with characteristics related to the energy and type (neutrons or gamma rays) of the impinging radiation as will be subsequently discussed in detail.

Gas saturation of a formation is determined by combining prompt gamma ray and fast neutron count rates. Detector responses are also affected by fluids within the borehole. As an example, if the borehole is liquid filled, borehole effects are minimized by combining fast neutron count rates, normalized to a given borehole condition, with the ratio of prompt gamma radiation measured in the near and far detectors. As a second example, if the borehole is gas filled, borehole effects are minimized by measuring fast neutron flux at the far detector in two different energy regions, and subsequently combining these two fast neutron measurements with the prompt gamma ray measurement to correct for variations in the size of a gas filled borehole. The minimization of the effects of gas filled and liquid filled boreholes upon measured prompt gamma and fast neutron count rates, respectively, are also discussed in subsequent sections of this disclosure.

The present invention exhibits many advantages over prior art systems which include delineation between high porosity gas saturated formations and low porosity water saturated formations. The measurement can be made in both open and cased boreholes, with both liquid and gas in the borehole. Accuracy and depth of investigation is improved since both the primary prompt gamma ray measurement and fast neutron measurements are made at the same source-detector spacing with preferably the same far spaced detector. The neutron generator can be disabled when the tool is removed from the borehole thereby reducing the risk of radiation exposure to personnel and property. Other advantages will become apparent in the following detailed description of the preferred embodiments of the invention.

BRIEF DESCRIPTION OF THE DRAWINGS

So that the manner in which the above recited features, advantages and objects of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

Figures 1, 2:
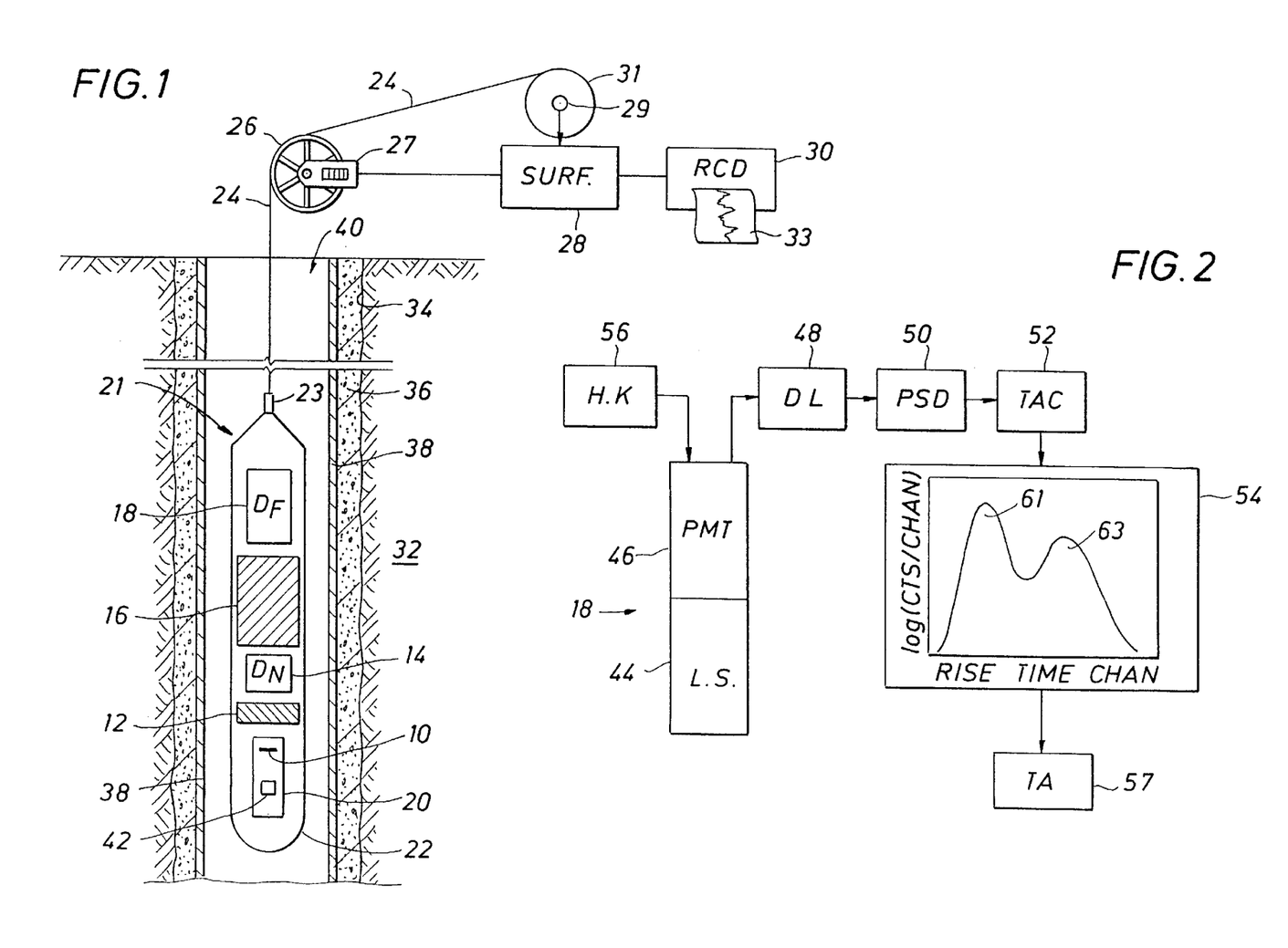
FIG. 1 is a schematic view of one embodiment of the fast neutron induced porosity and gas saturation well logging system showing the tool lowered within a borehole, the surface hoist, and surface instrumentation.
FIG. 2 is a block diagram of the far spaced fast neutron and gamma detector and electronics, including pulse-shape discrimination and time spectra analysis.

FIG. 1 depicts a logging tool 21 suspended within a borehole 40 by a logging cable 24. The borehole 40 penetrates earth formation 32, and is shown cased with typically steel casing 38. The annulus defined by the outside diameter of the casing 38 and the borehole wall 34 is filled with cement 36. One end of the logging cable 24 is mechanically and electrically connected to the logging tool 21 by means of a cable head 23. The cable 24 then passes over a calibrated sheave wheel 26 and to a winch reel 31. A depth indicator 27 is attached to the sheave wheel 26 thereby permitting a measurement of the amount of cable deployed in the borehole 24, and therefore the depth of the logging tool 21 in the borehole 40. The depth indicator is electrically connected to a set of surface equipment 28 which is used to control the operation of the logging tool 21 and to process and store data measured by the logging tool. The surface end of the logging cable terminates in a winch 31 and is electrically connected to the surface equipment 28 through electrical slip rings 29. Measurements made by the logging tool 21 are output to a recorder 30 which forms a tabulation of the measurements as a function of depth at which they were measured thereby creating the previously defined "log" 33. It should be understood that the log 33 can be in the form of an analog plot, a digital tabulation, or even a magnetic recording such as a tape or disk.

Still referring to FIG. 1, the logging tool 21 comprises a pressure tight housing 22 which contains a neutron generator assembly 20, a "near" axially spaced gamma ray detector 14 such as sodium iodide, and a "far" axially spaced fast neutron and gamma ray detector 18 such as a liquid scintillator. The neutron generator assembly 20 comprises a high energy neutron producing tritiated target 10 with associated deuterium gas reservoir and accelerated ion bean, high voltage supplies and pulsing electronics (not shown). Neutron generators which produce 14 MeV neutrons by the deuterium-tritium reaction are well known in the art and are commercially available. A monitor detector 42 is preferably located close to the neutron target 10 in order to monitor the somewhat variable neutron output produced by this type of generator. Logging system response can be normalized to a fixed or "standard" neutron output by means of the monitor detector response. The neutron source is pulsed and is capable of variations in both the pulse repetition rate and the pulse width. The preferred embodiment for the porosity/gas saturation logging system employs a pulse repetition rate of 3,000 Hz with a width of about 30 msec.

Still referring to FIG. 1, a fast neutron and gamma ray shield 12 is placed between neutron generator target 10 and the near gamma detector 14. The shielding material is preferably a material such as steel which will scatter, rather than thermalize, fast neutrons emitted from the target 10 into the formation 32 so that they can interact with formation nuclei thereby providing useful parametric information. The shield 12 also preferably contains an effective gamma ray shielding component to shield the gamma ray detector 14 from gamma radiation induced by the emitted neutron flux in the immediate vicinity of the target 10. The near detector 14 is located as close as possible to the target 10, while allowing for an adequate axial thickness for shield 12. The spacing of the near detector 14 from the target 10 is about 25 cm. The near gamma detector 14 preferably consists of a scintillator coupled to a photomultiplier tube. As stated previously, sodium iodide is an adequate scintillator for the near detector 14, although a scintillator with a faster decay time and made of a material that does not activate by thermal neutrons would be preferred. If sodium iodide is used for near detector 14, then it must be wrapped with a thermal neutron shield such as cadmium to minimize thermal activation within the crystal, and the gamma ray emissions resulting from the activation. In addition, the energy response of the detector is preferably electronically biased to exclude activation produced pulses within the detector crystal.

Again referring to FIG. 1, a fast neutron and gamma shield 16 is placed between near detector 14 and far detector 18. This shield, like the shield 12, prevents fast neutrons from the neutron generator assembly 20, and neutron induced gamma radiation, from "streaming" directly down the axis of the logging tool 21 and into the detector 18. A third detector (not shown), axially spaced about 50 cm form the neutron generator assembly 20, is employed in an alternate embodiment of the invention. The third detector is preferably a plastic scintillator sensitive to fast neutrons, and yields a response which is combined with the response of the detector 18 to form borehole corrections which will be discussed in a subsequent section of this disclosure.

In the preferred embodiment of the logging system, the far detector 18 contains a liquid scintillator and responds to both fast neutrons and gamma rays by producing light flashes or scintillations. FIG. 2 shows the components for far detector 18, including pulse processing electronics. The liquid scintillator is contained in a stainless steel cell 44 that is optically coupled to a special photomultiplier tube and base 46 designed to preserve the time dependence of the light production process within the liquid scintillator by incident radiation. A suitable organic liquid scintillator 44 for the detector 18 is BC504 manufactured by the Bicron Corporation. A double delay line amplifier 48 shapes and conditions the pulses for analysis by a pulse shape discriminator 50. Output from the pulse shape discriminator 50 is directed to a time-to-amplitude converter 52 which provides an output to multichannel analyzer 54 whose amplitude is proportional to the rise time of each pulse processed. The detector 18 and associated components produce pulses from gamma radiation that rise more rapidly than pulses produced by fast neutrons. The resulting pulse rise-time spectrum as stored by the multichannel analyzer 54 is shown in FIG. 2 as a logarithmic plot of counts per channel along the ordinate versus rise time channel along the abscissa. The peak 61 represents the measured gamma ray flux, and the peak 63 represents the measured fast neutron flux. Pulse shape discrimination as a technique for separating the fast neutron and gamma responses is a well developed method in the art. Using commercially available pulse-shape-discrimination hardware and other nuclear instrumentation, the fast neutron counts 63 and gamma ray counts 61 from detector 18 are separated and stored as a function of depth in the borehole. Gamma ray counts comprise contributions from both inelastic scatter (prompt) reactions and thermal capture (delayed) reactions. Since the inelastic scatter flux is the quantity of interest, a correction of the total gamma ray response for the thermal capture component must be made. One method of making this correction would be to obtain complete time spectra, from the beginning of one neutron pulse to the beginning of the next neutron pulse. Using this method, a time analyzer 57 would be required and would be triggered by the same pulse that triggers the neutron burst. Gamma ray counts measured between bursts would, by definition, be delayed gamma radiation and can be used to correct the total gamma radiation measured during the neutron burst for delayed gamma radiation. Details of the gamma count correction will be presented in a subsequent section of this disclosure.

An alternative embodiment of the far detector 18 (not shown) employs an assembly of two detectors in place of a single liquid scintillation type far detector. One detector component is a gamma scintillation detector, such as gadolinium orthosilicate (GSO), and the other detector component is a plastic scintillator responsive to impinging fast neutrons and gamma radiation. The disadvantage of this embodiment is that the plastic scintillator also responds to gamma radiation, and since it does not produce pulses with different rise times for neutrons and gamma rays, it is not possible to separate the neutron response from the gamma response. Therefore, the gamma detector response would have to be used as the basis for gamma compensating the plastic scintillator. However, this second embodiment has the advantage of being less costly and requires a less complicated signal processing apparatus. It also may have better potential for operation in deep wells where temperatures are elevated.

Using either the preferred liquid scintillator detector, or the alternate assembly of a gamma ray scintillator and a plastic scintillator, the spacing of the far detector 18 from the neutron target 10 is about 80 cm.

The far detector 18 must be of sufficient volume of about 300 $cm^3$ to provide counting rates adequate for anticipated logging speeds. The volume of the near detector 14 must be small to insure that gamma count rates during the neutron burst are not excessive. A volume of about 2 $cm^3$ is preferred.

The preferred liquid scintillator of far detector 18 (see FIG. 2) is hydrogenous and responds to fast neutrons by the proton recoil process with fairly constant efficiency in the energy range from about 0.5 MeV to 14 MeV. Its gamma response is due to Compton scattering from electrons of the scintillator atoms.

ANALYSIS OF DETECTOR RESPONSE

Figure 3:
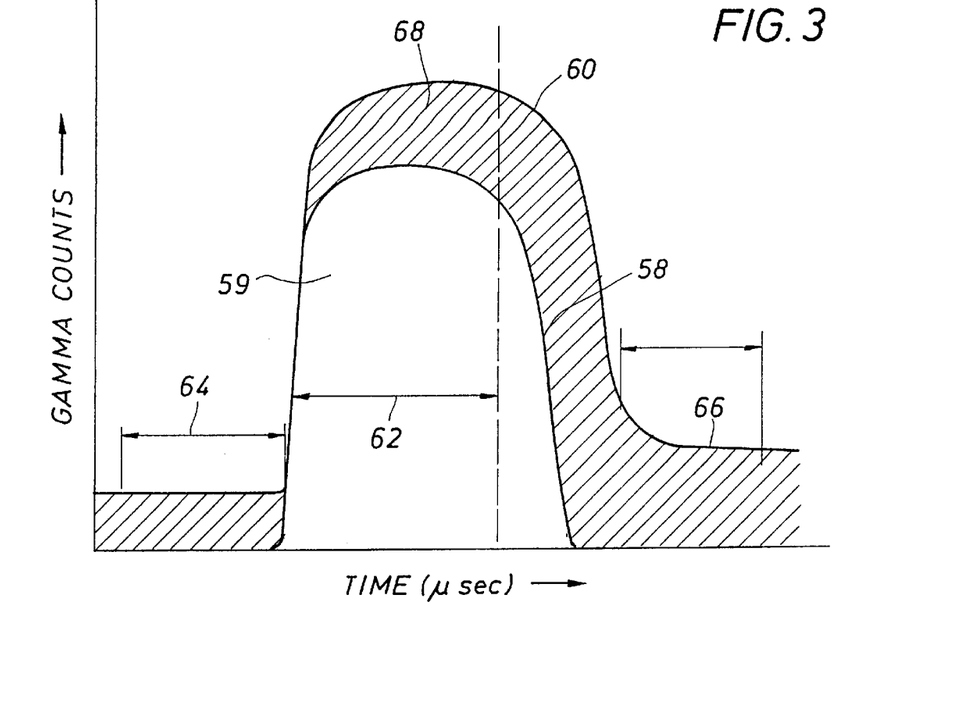
FIG. 3 is a plot of gamma ray counts as a function of time illustrating a correction of measured prompt gamma rays for thermal capture gamma rays.

Attention is next directed toward the analysis of the response of the far detector 18 to fast neutrons and to both prompt and delayed gamma radiation resulting from inelastic scatter and thermal capture reactions, respectively. Both detectors 14 and 18 in FIG. 1 are gated so that their pulses are processed and stored during certain time intervals in reference to the beginning of each pulse of neutrons from the neutron generator 20. These time gates are designed to produce detector responses to both prompt and to delayed radiations. The delayed radiation response provides data for correcting the prompt response for gamma rays produced by thermal neutron capture. Attention is directed to FIG. 3 which shows a curve 60 which represents the total gamma ray count rate response of the far detector 18 plotted as a function of time. Neutron response has been removed using previously discussed pulse shape discrimination methods. A prompt time gate 62 begins at the start of the neutron burst and ends as the source pulse rapidly decreases to zero. The width of the prompt gate is about 25 msec. Two capture gamma ray gates 64 and 66 are shown to occur in time just prior to and just after the neutron burst, respectively. The widths of these gates are preferably 25 msec, although other gate widths could be used with proper time normalization factors. The shaded region 68 during the prompt gate is the capture gamma ray contribution to the total gamma radiation 60. Its relation to gates 64 and 66 is determined by measuring time spectra of the fast neutron and gamma ray response from the detector 18. From this relationship, a capture gamma ray correction can be derived and subtracted from the gamma ray response thereby yielding a numerical value for the prompt count rate, represented by the area 59 in FIG. 3. A rough estimate of the count rate 68 would be a simple average of count rates measured during the gates 64 and 66 since all gate widths depicted in FIG. 3 are the same. It should be understood that more accurate corrections can be made by measuring capture radiation in multiple gates before each burst thereby determining the decay rate of capture gamma radiation which can be subtracted from the composite gamma ray measurement during the burst. The complicated shape of the neutron burst obtained from the fast neutron time spectra show that there is not a simple exponential build up of capture gamma radiation during the burst, therefore a measure of decay rate after the burst can not be used to directly compute capture radiation during the burst. A convolution of the burst shape, normalized to the prompt gamma ray time spectrum and combined with measured decay rate after the burst, will yield a more accurate correction for capture radiation. Furthermore, a measure of decay rate after the burst would be similar to capture gamma decay rates measured in previously discussed pulsed neutron logging systems used to delineate hydrocarbon from saline water. Stated another way, the present invention can be configured to measure gas saturation and porosity of the formation, as well as the well known capture cross section parameter "sigma".

PRINCIPLES OF OPERATION

The porosity and water or gas saturation condition of earth formations 32 are determined by detecting gamma radiation produced promptly by fast neutron reactions with formation atoms and by detecting fast neutrons at a suitably spaced detector 18 as the source neutrons scatter from and react with formation nuclei. Interpretation charts determined from calibration measurements with the logging system in known formation and borehole conditions, and with computer simulations, are used to infer the formation parameters of interest (porosity and water or gas saturation) from the measured gamma and neutron count rates. The interpretation is influenced by formation matrix composition and by borehole conditions, and will be uncertain to the extent that these other parameters are not known. Corrections to minimize the effects of variations in liquid and gas filled borehole conditions will, however, be disclosed.

Referring again to FIG. 1, the high energy neutron source 20 at target 10 repetitively emits pulses or bursts of neutrons in relatively short duration of approximately 30 ms, with a repetition rate of about 3,000 pulses per second. The fast neutrons from target 10 react promptly with atomic nuclei in formation 32, principally silicon and oxygen in the case of a silica matrix, or calcium, carbon and oxygen in the case of a limestone matrix. Some of the fast neutrons also scatter from the hydrogen associated with any water present in the formation. Of course, the neutrons also react with atoms of the tool housing 22 and nearby borehole casing 38, cement 36, and any liquid that might be in the borehole 40. These latter reactions produce undesirable responses in that they yield no information concerning the formation parameters of interest and further interfere with the response of interest from the formation. Detectors 14 and 18 are gated to detect fast neutrons and prompt gamma rays during the time of the neutron burst. The prompt gamma response contains, as discussed earlier, an unwanted capture component due to the thermalization of fast neutrons and their subsequent capture during the time of the neutron source pulse. Corrections are made to eliminate the thermal capture components.

Again referring to FIG. 1, some of the gamma rays detected promptly, during the neutron burst, by both detectors 14 and 18 are from inelastic scattering of the fast neutrons from formation nuclei in formation 32. Some of the fast neutrons detected by far detector 18 have scattered elastically and inelastically from nuclei in formation 32. The detected neutrons have an energy in the range from 0.5 to 14 MeV. Scattering from the hydrogen contained in the formation 32 has a unique effect on the flux and the energy distribution of fast neutrons in the vicinity of near detector 14 and far detector 18. This is due to two properties of hydrogen which are (1) the scattering probability is substantial at the 0.5 MeV minimum detected energy but decreases rapidly in the detected range from 2 to 14 MeV, and (2) the hydrogen nucleus has nearly the same mass as the neutron so that, unlike any other element, it can acquire most or all the energy from a fast neutron in a single scattering. The fast neutron measurement therefore has a special response to the hydrogen associated with moisture or hydrogen content of the formation surrounding the borehole. For most earth formations, the rock formation does not contain hydrogen, and this special response is associated uniquely with the liquid that fills pore space of the rock matrix. To a lesser extent, the fast neutron measurement responds to changes in bulk density, especially when the moisture content is very low. If the capture gamma ray component is removed from the prompt gamma ray measurement, the resulting inelastic gamma ray response is primarily sensitive to changes in atom density of the formation, which is also a weak function of the moisture content of the formation. Stated simply, the inelastic gamma and fast neutron responses are both affected by changes in formation density (or porosity) and by changes in formation water (or gas) saturation. However, the two responses depend differently on changes in these formation parameters. Therefore, for a known formation matrix such as silica or limestone, the disclosed logging system can produce values for water (or gas) saturation and porosity (or bulk density) from the combined measures fast neutron and inelastic gamma responses by use of a two-dimensional transform grid determined from calibration data with known physical models and from computer simulations. A given transform grid is appropriate only for a particular rock matrix and set of borehole conditions.

COMPENSATION FOR VARIATIONS IN LIQUID FILLED BOREHOLES

As discussed previously, the logging system can be effectively operated in cased and open boreholes, and in gas filled and liquid filled boreholes. This does not, however, imply that the measurements are independent of borehole conditions. The effects of borehole conditions on the measurements can, however, be determined and the measurements can be compensated or corrected for these borehole conditions.

It has been determined that the fast neutron and prompt gamma measurements are affected to varying degrees by variations in the diameter of a liquid filled borehole. Since the borehole diameter is often not known precisely through the entire logged interval, it is highly desirable to "automatically" correct the pertinent log measurements using parameters that can be measured by the logging tool.

Figure 4:
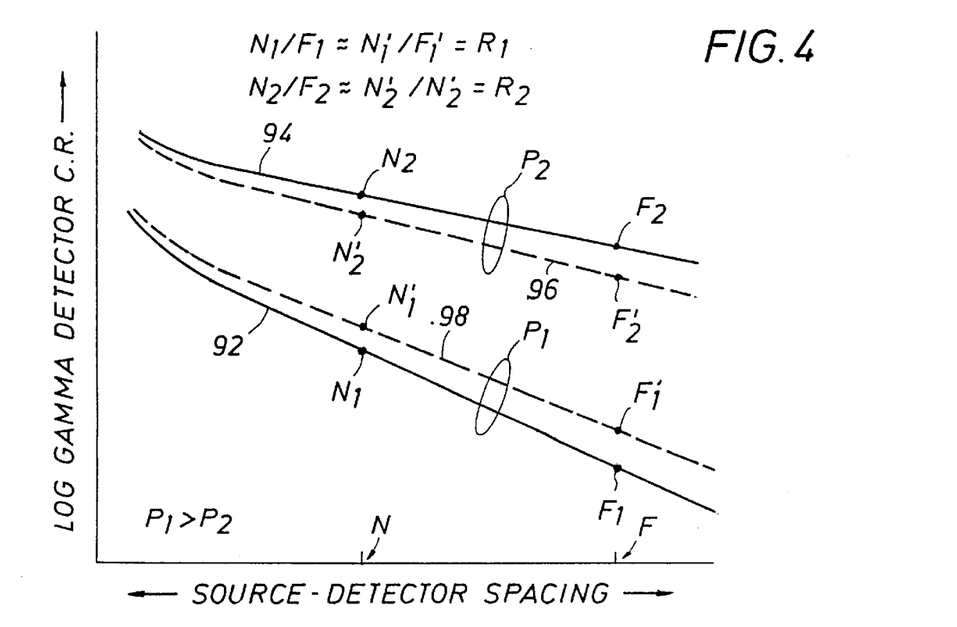
FIG. 4 illustrates the basis for correcting measured gamma radiation for size variations in liquid filled boreholes.

FIG. 4 illustrates the gamma ray response of the logging tool plotted as a function of neutron source—gamma ray detector spacing for various formation and borehole conditions. Curves 92 and 94 show a computer simulated dependence of inelastic gamma counts on gamma ray detector spacing for two formation densities $r_1$ and $r_2$ without a borehole, while curves 96 and 98 are similar curves for the presence of a water-filled borehole with steel casing and cement behind the casing. Note the parallelism of curves for a given density ($r_1$ or $r_2$) for sufficiently large source-detector spacings. If two detectors are used at source-detector spacings marked N and F in FIG. 4, then the ratio of counts is about the same for a given density $r_1$ or $r_2$ for both borehole conditions. That is $$N_i/F_i \approx N'_i/F'_i = R_i$$

where $N_i$=a gamma ray count rate measured at source-detector spacing N with no borehole;

$F_i$=a gamma ray count rate measured at source-detector spacing F with no borehole;

$N'_i$=a gamma ray count rate measured at source-detector spacing N with a water filled borehole;

$F'_i$=a gamma ray count rate measured at source-detector spacing F with a water filled borehole;

$R_i$=the ratio of count rates $N_i/F_i$ or $N'_i/F'_i$; and i=1,2 corresponds to a density index for a formation density of $r_1$ or $r_2$, respectively.

Values of N and F of 50 cm and 100 cm, respectively, are sufficiently large to meet the criteria of the above set of equations. Note graphically that for both densities $r_1$ and $r_2$, the ratio with and without the prime symbol are about the same, due to the parallelism of the curves 92 and 98, and curves 94 and 96, for source-detector spacings greater than N. In determining gas or liquid formation saturation, and formation porosity, the measured fast neutron count rate is preferably combined with a ratio R of gamma count rates measured with detectors 14 and 18 (see FIG. 1). Although the ratio R minimizes the effects of variations in the size of liquid filled boreholes on the gamma ray measurement, a borehole variation effect remains for the fast neutron count rate.

Fast neutron count rate as a function of detector spacing has also been measured and computed for various liquid filled boreholes and various cement annulus thicknesses behind borehole casing. A parallelism of curves for a given formation condition as borehole condition is varied occurs analogous to that described for the inelastic gamma count rate and shown in FIG. 4. If a single fast neutron detector is preferred, the fast neutron count rate is corrected for liquid filled borehole conditions by normalizing the measured count rates to standard borehole conditions. More specifically, fast neutron count rate $C_F$ for a "standard" liquid filled borehole condition is determined by combining a measured fast neutron count rate in borehole conditions which are "non-standard" with a multiplicative factor which is a function of borehole conditions. Mathematically $$C_F = C_{F,m} \times f(d_{bh}, d_{cmt})$$

where $C_{F,m}$=the measured fast neutron count rate;

$d_{bh}$=the diameter of the borehole;

$d_{cmt}$=the thickness of the cement sheath; and $f(d_{bh}, d_{cmt})$=a multiplicative factor which is a function $d_{bh}$ and $d_{cmt}$.

$f(d_{bh}, d_{cmt})$ is determined by either computing, or measuring, or combining computations and measurements of $C_{F,m}$ in liquid filled boreholes of known conditions, namely $d_{bh}$, and $d_{cmt}$.

Computer simulations suggest that $f(d_{bh}, d_{cmt})$ may also depend upon formation conditions, especially in high porosity formations. This dependency is somewhat detrimental to the correction formalism disclosed above. An alternate borehole correction method utilizes a second fast neutron detector spaced about 50 cm from the neutron source. A ratio $R_F$ of the response of the two fast neutron detector responses is then computed. The normalized count rate $C_F$ above is then replaced by $R_F$ for water filled boreholes in the interpretation chart of FIG. 5. This alternate borehole compensation method therefore eliminates the need for the term $f(d_{bh}, d_{cmt})$, but increases the complexity and the expense of the logging tool by the addition of a second fast neutron detector.

The fast neutron and gamma ray curve parallelism exhibited in FIG. 4 does not occur for air filled boreholes. A ratio R of gamma ray count rates, and a corresponding ratio of fast neutron count rates, does not compensate for size variations in gas filled boreholes. A method for minimizing the effects of variations in air filled boreholes upon both measured fast neutron and measured gamma ray count rates will be disclosed in a subsequent section.

DETERMINATION OF FORMATION FLUID SATURATION AND POROSITY

Figure 5:
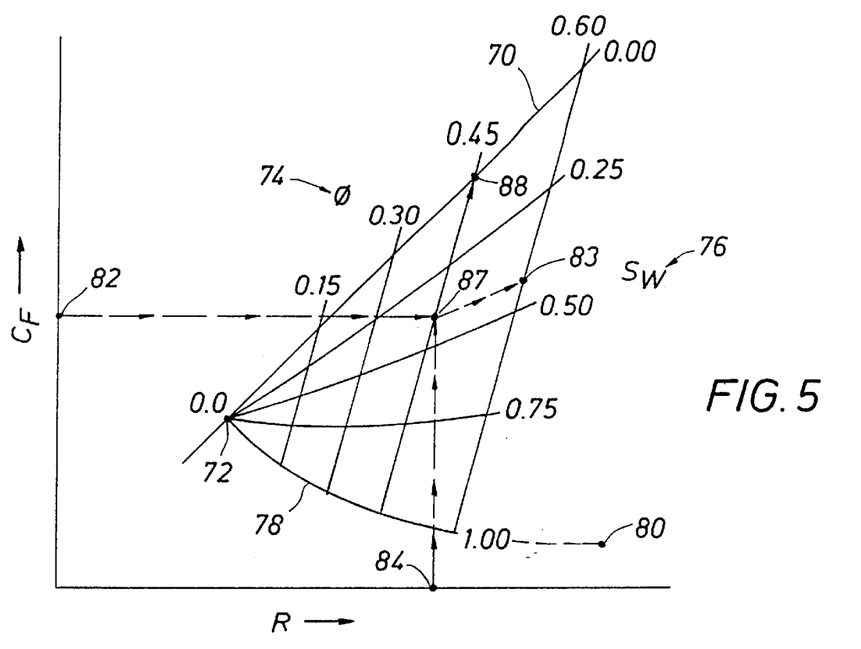
FIG. 5 shows a transform grid used to convert measured data into formation parameters of interest.

Attention is directed to FIG. 5 which shows a plot of fast neutron count rate, $C_F$, corrected for any "non standard" liquid filled borehole conditions, plotted as a function of the ratio R of near detector to far detector prompt gamma count rate, corrected for thermal capture gamma radiation, for various formation porosities f and formation water saturations $S_w$. The porosity f represents fractional pore space, and $S_w$ is also a fractional water saturation. It should be emphasized that the fractional gas saturation of the formation, $S_G$, is computed from the equation $$S_G = 1 - S_W$$

The straight line 70 is obtained when fast neutron count rate is plotted versus the prompt gamma count ratio R (detector 18/detector 14) for the case of a dry formation (e.g.. silica) as its pore fraction f varies from 0 (solid silica) at the location labeled 72 to 0.6, a pore fraction that is a practical limit for most earth formations. Various intermediate pore fraction values f, represented by constant porosity lines and identified as a group by the numeral 74, are marked on this "dry" porosity line. The lines of constant f develop as water is added to the pore space. Line 78 is obtained for the fully water saturated condition for the same formation and porosity range. The line extrapolates to point 80 for a pore fraction of 1.0, corresponding to pure water. Various intermediate water saturation values $S_W$ ranging between 0.0 and 1.0, represented by constant water saturation lines and identified by the numeral 76, are marked on the f=0.6 line. As a result, an interpretation transform grid is generated with water saturation fractions $S_W$ ranging between the extremes of 0.0 (dry pore space) and 1.0 (completely water saturated pore space), and porosities f ranging from 0.0 to 0.6. When a measured data pair $C_F$ and R are obtained at a particular depth in a borehole from the fast neutron response of detector 18 and from the ratio of the inelastic gamma response of detector 18 to the gamma response of detector 14, their coordinates 82 and 84 are plotted on the transform grid ordinate and abscissa, respectively. Orthogonal lines are then projected to an intersection point 87, and $S_w$ (or $S_G$) and f are thereby obtained. For the example shown in FIG. 5, $S_w$ is determined by the point 83 and is 0.4 ($S_G$=0.6), and f is determined by the point 89 and is 0.45.

The transform grid in FIG. 5 produces the desired formation parameters of porosity (or bulk density) and gas saturation (or water saturation) when the system logs a liquid filled borehole and measures fast neutron counts versus depth, and inelastic gamma ray counts versus depth, and when the formation mineral (matrix) and borehole conditions conform to those assumed for the nominal transform grid. Stated another way, the grid in FIG. 5 represents the response of the system for one set of borehole conditions and for one formation lithology. If the borehole is gas filled, then a new transform grid must be used, or alternately the measured parameters must be normalized as discussed in a later section (COMPENSATION FOR VARIATION IN GAS FILLED BOREHOLES) before the desired parameters are determined, or alternately the determined parameters themselves must be corrected for changes in borehole conditions. The previously discussed gamma ray ratio and ratio normalization techniques greatly reduce the effects of liquid filled borehole size variations. The increased depth of investigation of the disclosed system generally reduces borehole effects when compared with prior art systems. Similarly, if the matrix differs from that assumed for the transform grid, then a correction must be applied to the values of porosity and gas saturation obtained from the transform.

It should be noted that the fast neutron count rate $C_F$ is not a ratio, and is therefore affected by any variations in the output of the neutron generator 20. The transform grids of the form shown in FIG. 5 are generated for a "standard" fast neutron output, which might be of the order of $10^8$ neutrons per second. If the neutron output does vary, this variation is detected by the monitor detector 42 (see FIG. 1) and the measured value $C_F$ can be normalized to a standard neutron output value.

The determination of water (or gas) saturation and formation porosity shown in FIG. 5 is graphical for purposes of illustration. It should be understood that in the actual operation of the system, transform grids are stored in digital form in the surface equipment 28 as a "look-up" table or the like, and all determinations of $S_w$ and f are performed analytically within the surface equipment 28 and output as a log 33 as a function of depth at which they were measured.

DEPTH OF INVESTIGATION

Figure 6:
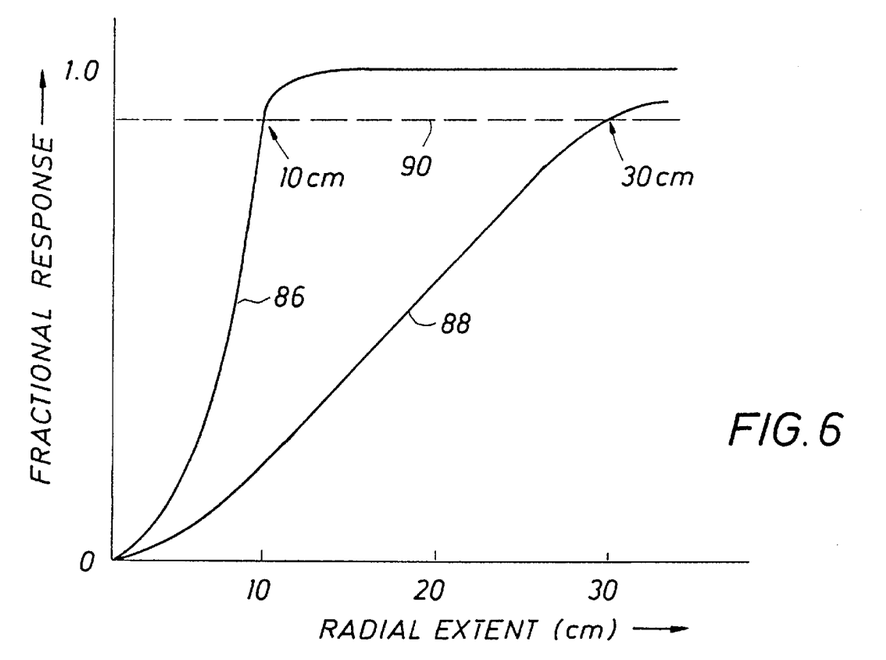
FIG. 6 compares the depth of investigation of the present logging system with the depth of investigation of prior art systems.

The improved investigation depth of the logging system is illustrated in FIG. 6 where the fractional density responses versus radial thickness of the formation are compared for the prior art gamma-gamma density tool, identified as curve 86, and the system set forth in this disclosure, identified as curve 88. Curve 88 was obtained by computer simulation. If the investigation depth is defined as the radius at which 90 percent of the response is obtained, identified by the line 90, then the disclosed density/gas saturation logging system has an investigation depth of about 30 cm, while the prior art investigation depth is 10 to 12 cm. The density measurement of the present logging tool "sees" almost three times as far into the formation in the radial direction than the prior art gamma-gamma method. This means that the disclosed density/gas saturation logging tool has the potential for reduced sensitivity to changes in the borehole conditions and increased sensitivity to changes in formation density (porosity) and gas (or water) saturation than the prior art.

COMPENSATION FOR VARIATIONS IN GAS FILLED BOREHOLES

As mentioned previously, the gamma ray ratio method will not compensate for variations in the size of air filled boreholes, therefore an alternate method must be used. In addition, a compensation method has also been developed to correct measured fast neutron count rates for variations in gas filled borehole geometry. The fast neutron correction will be discussed first, and is deployed using the fast neutron energy discrimination properties of the liquid scintillator far spaced detector 18.

Numerous tests and computations were employed in order to determine the optimum energy bias for the fast neutron measurement. The lowest bias settings of 0.2 MeV produced spectra with very poor gamma ray—neutron separation and could not be effectively processed. Higher threshold settings improved gamma ray-neutron resolution, but resulted in reduced counting rates thereby increasing the statistical uncertainty of the measurements. A neutron energy threshold setting of 0.5 MeV was elected as a nominal setting. The transform grid of the form shown in FIG. 5 is based upon an 0.5 MeV bias setting.

Figure 7:
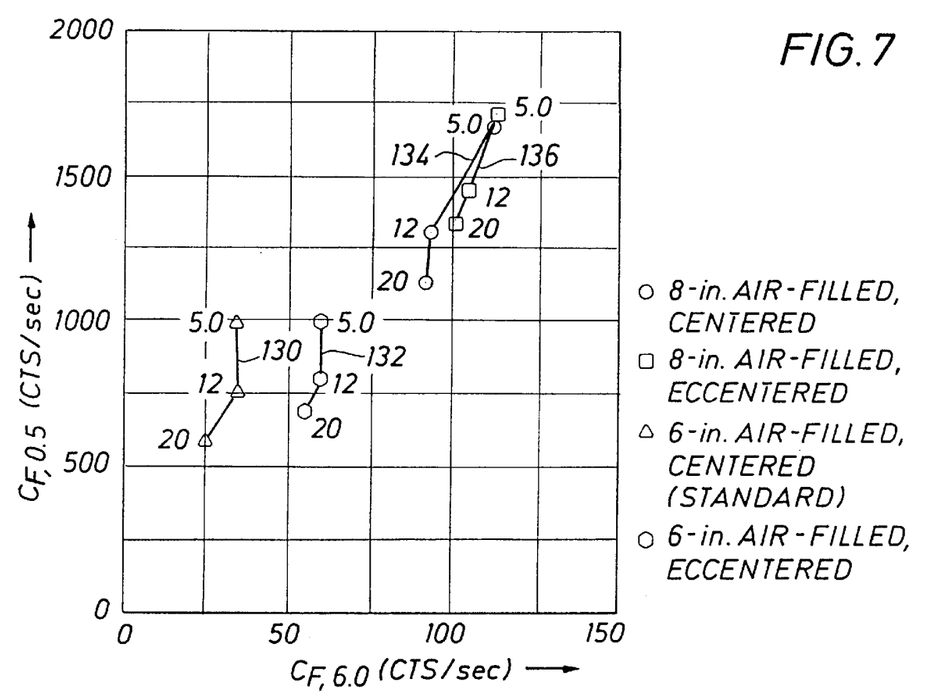
FIG. 7 illustrates fast neutron flux measurements at two energy biases for formations with varying moisture content and with varying air filled borehole conditions.

Bias settings as high as 6.0 MeV can be employed. FIG. 7 shows a plot of fast neutron count rate with a 0.5 MeV bias, $C_{F,0.5}$, plotted as a function of fast neutron count rate with a 6.0 MeV bias, $C_{F,6.0}$, for formations with varying moisture content and varying, air filled borehole geometries. As an example, the group of data points 130 represents measurements in a 6 inch (in.) diameter, air filled borehole with the logging tool centered within the borehole, with moisture content of the formation ranging from 5.0 volume percent to 20 volume percent. The groups of data points identified by the numerals 132, 134 and 136 represent measurements made in identical formations but with the logging tool eccentered in a 6 in. air filled borehole, centered in a 8 in. air filled borehole, and eccentered in an 8 in air filled borehole. It is readily apparent that such a plot is more dependent upon borehole conditions than upon moisture content of the formation, and therefore can readily be used to identify air filled borehole conditions encountered by the logging tool, and to subsequently correct for these conditions.

Figure 8:
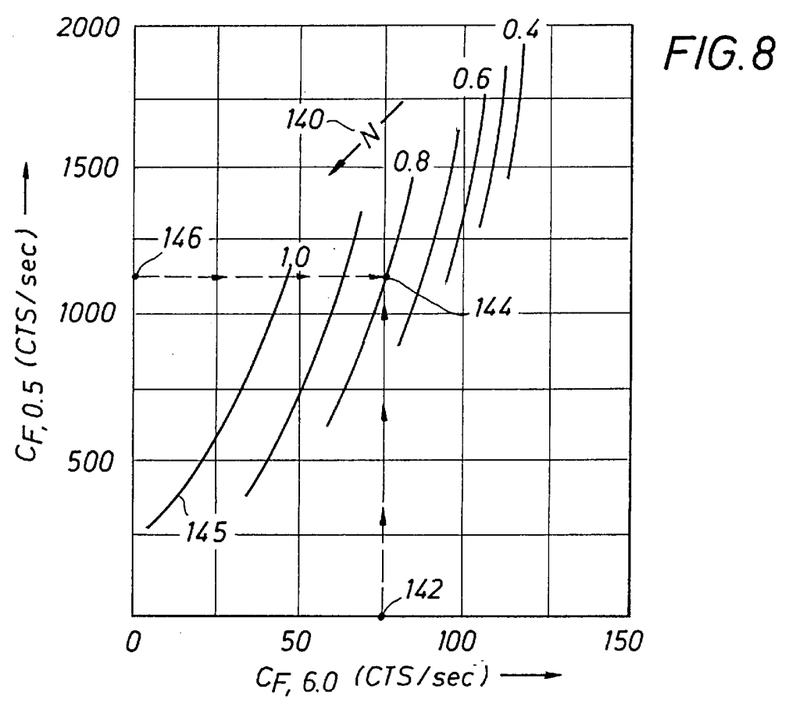
FIG. 8 illustrates graphically a method for correcting the response of the logging system to variations in the size of air filled boreholes.

One method for correcting measured fast neutron count rate for variations in air filled boreholes is illustrated graphically in FIG. 8. The method is only approximate, and it should be understood that more elaborate methods, such as iterations involving "apparent" water saturation, can be used to produce more accurate corrections. In using the correction technique shown in FIG. 8, a "standard" borehole condition must first be defined. For purposes of illustration, a 6.0 in. diameter air filled borehole with the tool centered in is defined as "standard" borehole conditions. If the system logs in standard boreholes, measured values of $C_{F,0.5}$ and $C_{F,6.0}$ will fall along or near a curve 145 for all saturation conditions. This curve is assigned a value of N=1.0, which will be explained below. Assuming that an appropriate transform grid has been selected for a 6.0 in, air filled borehole and that the logging tool is held centralized within the borehole using centralizers or the like, then the measured value of $C_{F,0.5}$ can be input directly as the value of $C_F$, and correct values of water (gas) saturation and porosity will be obtained. If the borehole conditions unexpectedly change, such as increasing in size and shape such that the tool is effectively partially eccentered, then a plot of measured values of $C_{F,0.5}$ and $C_{F,6.0}$ will not fall along the curve 145, but will fall to the right of this curve. Referring again to FIG. 7, the value of $C_{F,0.5}$ will tend to increase, for a given moisture content, above that which would be measured if the borehole were "standard". The value of $C_{F,0.5}$ would, therefore, be erroneously high and yield inaccurate results if input directly into the transform grid. It must, therefore, be "normalized" to a lower value. This process is shown by graphical example, where measured values 142 and 146 of $C_{F,0.5}$ and $C_{F,6.0}$, respectively, are plotted and projected to an intersection point 144. This point happens to fall on a curve labeled N=0.8, which is the normalization value for $C_{F,0.5}$. Stated mathematically, the value $C_F$ input to a transform grid for a 6.0 in. air filled borehole with the logging tool centered therein, is computed from the equation $C_F = N \times C_{F,0.5}$ where $C_{F,0.5}$ is the measured fast neutron flux, and N=0.8 for the example shown.

Correction or normalization of the inelastic gamma ray measurement in air filled boreholes of varying conditions must also be addressed. If inelastic scatter gamma radiation count rates were measured at a high bias energy level and a low bias energy level for a variety of formation and air filled borehole conditions, and if the high energy bias count rate were plotted as a function of the low energy count rate, it is thought that a family of curves would be generated which is similar in form to the fast neutron data shown in FIG. 7. It is also thought that from these plots of gamma ray data of this form, a gamma ray normalization factor, $N_{gr}$, can be derived analogous to the inelastic scatter neutron correction factor N shown in FIG. 8. The value of the inelastic gamma ray ratio R input to a transform grid for a "standard" air filled borehole would then be $R = R_m \times N_{gr}$ where $R_m$ is the measured inelastic gamma ray count rate ratio.

OTHER APPLICATIONS

Although the invention was conceived for use in boreholes to log the density (porosity) and gas (water) content in subsurface geologic formations, the method has other applications such as the surface analysis required of highway roadbeds prior to paving the surface. It is very important to establish that this substrate material is of the proper bulk density and moisture content before the paving process begins. The existing nuclear gamma density and neutron moisture gauges used for this purpose are losing favor with the industry because of the required radioactive sources and their related licensing and safety difficulties. The density and water saturation of the present invention represents a desirable replacement for existing density and neutron gauges for the highway surface application. Similar applications may exist in industrial process control where material density and/or moisture content must be monitored during manufacture of products.

While the foregoing disclosure is directed to the preferred embodiments of the present invention, other and further embodiments of the invention may be devised without departing from the basic scope thereof, and the scope thereof is determined by the claims which follow.

What is claimed is:

1. A method for measuring at least one parameter of a material, the method comprising:
    (a) sequentially irradiating said material with high energy neutrons;
    (b) measuring fast neutrons resulting from interaction of said high energy neutrons with said material;
    (c) measuring prompt gamma radiation resulting from inelastic scatter of said high energy neutrons within said material by combining a measure of gamma radiation during said sequential irradiations and a measure of gamma radiation between said sequential irradiations; and
    (d) combining said measure of fast neutrons and said measure of prompt gamma radiation to determine said parameter of said material.

2. The method of claim 1 wherein said material comprises earth formation penetrated by a borehole.

3. The method of claim 2 wherein said formation is irradiated with pulses of high energy neutrons produced by a neutron generator.

4. The method of claim 3 further comprising:
    (a) within said borehole, axially spacing a gamma ray detector at a first spacing from said neutron generator;
    (b) measuring said prompt gamma radiation at said first spacing with said gamma ray detector;
    (c) within said borehole, axially spacing a second detection at a second spacing from said neutron generator; and
    (d) measuring said fast neutrons at said second spacing with said second detector.

5. The method of claim 4 wherein said second spacing is greater than said first spacing.

6. A method of measuring at least one parameter of earth formation penetrated by a borehole, the method comprising:
    (a) irradiating said earth formation with high energy neutrons produced by a neutron generator within said borehole:
    (b) within said borehole, axially spacing a gamma ray detector at a first spacing from said neutron generator;
    (c) measuring prompt gamma radiation at said first spacing with said gamma ray detector;
    (d) within said borehole, axially spacing a second detector at a second spacing from said neutron generator;
    (e) measuring said prompt gamma radiation at said second spacing with said second detector;
    (f) measuring fast neutrons at a high energy level and a low energy level at said second spacing with said second detector;
    (g) combining said prompt gamma radiation measurement at said first spacing and said prompt gamma ray measurement at said second spacing to minimize effects of said borehole upon said determination of said parameter of said earth formation;
    (h) combining said measure of fast neutrons and said measure of prompt gamma radiation to determine said parameter of said earth formation; and
    (i) combining said fast neutron high energy measurement and said fast neutron low energy measurement to minimize effects of said borehole upon said determination of said parameter of said earth formation.

7. The method of claim 6 wherein said gamma ray measurements at said first and said second spacings and said fast neutron measurements at said high energy level and said low energy level are made during said neutron pulses.

8. The method of claim 1 wherein said at least one parameter comprises gas saturation.

9. The method of claim 1 wherein said at least one parameter comprises porosity.

10. The method of claim 1 wherein said at least one parameter comprises bulk density.

11. A method for measuring at least one property of material penetrated by a borehole, comprising:
    (a) providing a logging tool comprising
        (i) a pulsed source of high energy neutrons;
        (ii) a first detector spaced axially at a near spacing from said neutron source and sensitive to gamma radiation; and
        (iii) a second detector spaced axially at a far spacing from said neutron source and sensitive to gamma radiation and neutron radiation;
    (b) with said first detector, measuring a first gamma ray measurement during pulsing of said neutron source;
    (c) with said second detector, measuring a second gamma ray measurement during said pulsing of said neutron source;

(d) with said second detector, measuring neutron radiation during said pulsing of said neutron source;

(e) correcting said first gamma ray measurement for capture gamma radiation thereby obtaining a first measure of prompt gamma radiation, and correcting said second gamma ray measurement thereby obtaining a second prompt gamma ray measurement;

(f) correcting said neutron measurement for effects of gamma radiation thereby obtaining a fast neutron scattering measurement; and (g) combining said first prompt gamma ray measurement, said second prompt gamma ray measurement, said fast neutron scatter measurement to obtain a measure of said property in which the effects of said borehole are minimized.

12. The method of claim 11 further comprising:

(a) using pulse shape discrimination with said second detector to separate said second gamma ray measurement from said neutron measurement;

(b) with said second detector, making a high energy level fast neutron scattering measurement and a low energy level fast neutron scattering measurement;

(c) measuring gamma radiation with said first detector and said second detector between pulsing of said neutron source to obtain measures of delayed gamma radiation; and (d) combining said measures of delayed gamma radiation with said first gamma ray measurement and said second gamma ray measurement to obtain said first and said second prompt gamma ray measurements.

13. The method of claim 12 wherein the effects of a liquid filled borehole upon said first prompt gamma ray measurement and said second prompt gamma ray measurement are minimized by forming a ratio of said first and said second prompt gamma ray measurements.

14. The method of claim 12 wherein the effects of a gas filled borehole upon said neutron radiation measurement are minimized by combining said high energy level fast neutron scattering measurement and said low energy level fast neutron scattering measurement.

15. The method of claim 12 wherein the effects of a liquid filled borehole upon said neutron radiation measurement are minimized by normalizing said neutron measurement to a known borehole condition, and combining said normalized measurement with a ratio of said first prompt gamma ray measurement and said second prompt gamma ray measurement.

16. The method of claim 12 wherein the effects of a gas filled borehole upon said first prompt gamma ray measurement and said second prompt gamma ray measurement are minimized by:

(a) measuring said first prompt gamma ray measurement at two different energy levels in known materials and known borehole conditions;

(b) combining said gamma ray measurements at two different energy levels to obtain a ratio normalization factor; and (c) combining said ratio normalization factor with said ratio of said first and said second prompt gamma ray measurements.

17. The method of claim 11 wherein said at least one property comprises gas saturation.

18. The method of claim 11 wherein said at least one property comprises porosity.

19. The method of claim 11 wherein said at least one property comprises bulk density.

20. A logging system for determining at least one property of a formation penetrated by a borehole comprising:

(a) a pressure housing containing
 (i) a pulsed neutron generator;
 (ii) a first detector sensitive to gamma radiation;
 (iii) a second detector sensitive to fast neutrons and to gamma radiation; and
 (iv) circuitry means for delineating the response of said second detector to scattered fast neutrons and prompt gamma radiation;

(b) a computer; and (c) a predetermined relationship for combining, within said computer, prompt gamma radiation measured with said first detector, prompt gamma radiation measured with said second detector, and fast neutron radiation measured with said second detector thereby obtaining a measure of said at least one property in which adverse effects of said borehole are minimized.

21. The system of claim 20 wherein said pulsed neutron generator:

(a) emits neutrons with energy of about 14 MeV;

(b) is operated at a pulse repetition rate of about 3,000 Hz;

(c) is operated with a pulse width of about 30 microseconds.

22. The system of claim 20 wherein:

(a) said first detector comprises a solid scintillator;

(b) said second detector comprises a liquid scintillator;

(c) said first detector is axially spaced about 40 centimeters from said generator; and (d) said second detector is axially spaced from said generator at a distance of about 80 centimeters.

23. The system of claim 20 wherein said circuitry means delineates the neutron response from the gamma ray response of said second detector by pulse shape discrimination.

24. The system of claim 20 further comprising additional circuitry which:

(a) allows said second detector to measure neutron response at a plurality of energy levels; and (b) allows said first detector to measure gamma radiation at a plurality of energy levels.

* * * * *